Feb. 15, 1966    R. M. SCOTT    3,234,865
PANORAMIC CAMERA
Original Filed Feb. 6, 1959    3 Sheets-Sheet 1

INVENTOR.
R. M. SCOTT
BY
ATTORNEY.

Feb. 15, 1966 R. M. SCOTT 3,234,865
PANORAMIC CAMERA
Original Filed Feb. 6, 1959 3 Sheets-Sheet 2
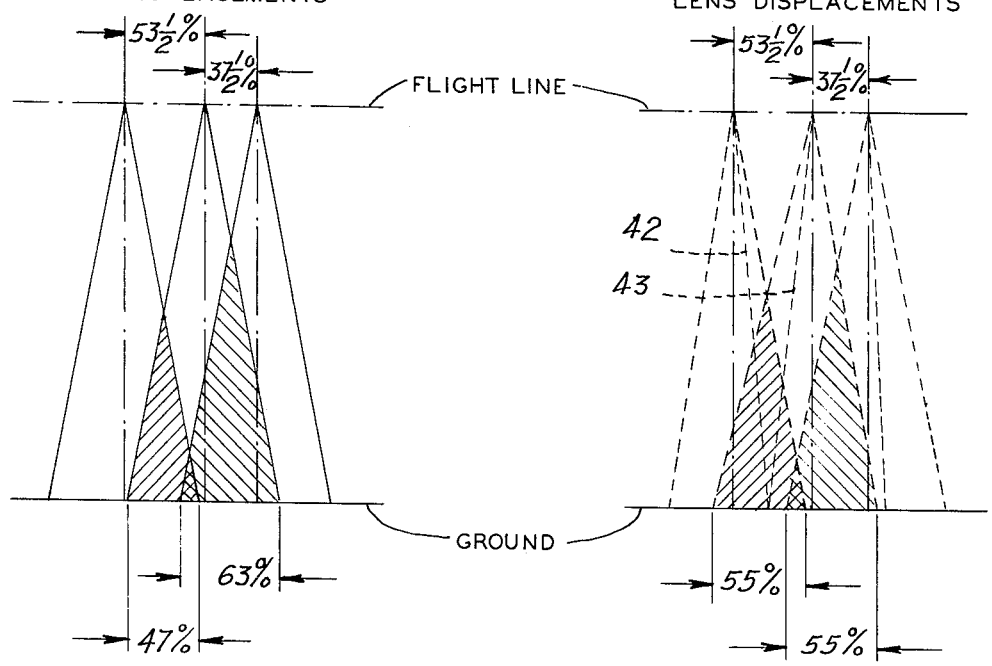
FIG. 3A. WITHOUT LENS DISPLACEMENTS
FIG. 3B. WITH LENS DISPLACEMENTS
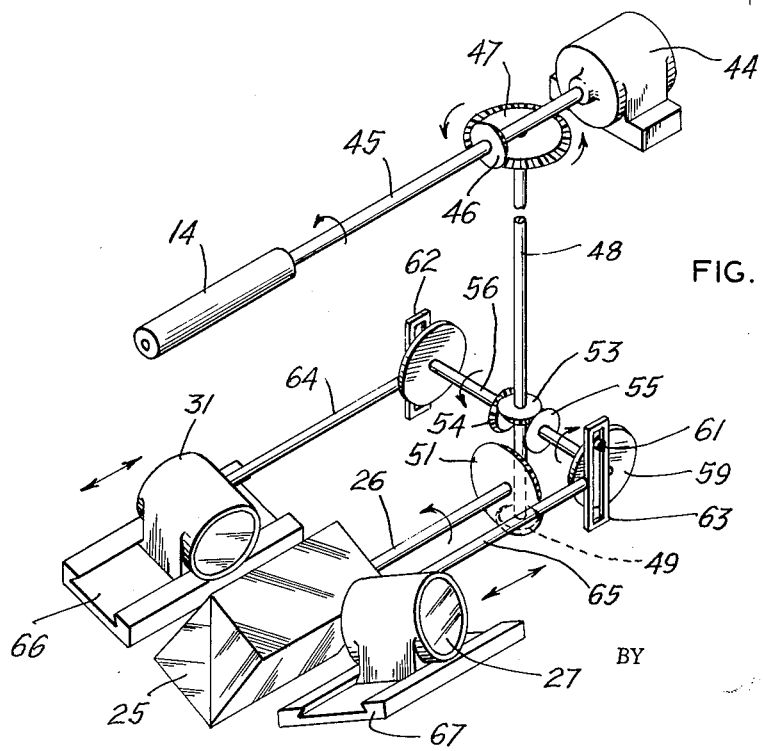
FIG. 4.
INVENTOR.
R. M. SCOTT
BY
ATTORNEY Feb. 15, 1966     R. M. SCOTT     3,234,865
PANORAMIC CAMERA Original Filed Feb. 6, 1959     3 Sheets-Sheet 3

INVENTOR
RODERIC M. SCOTT

BY

ATTORNEY

# United States Patent Office 3,234,865
Patented Feb. 15, 1966

3,234,865
PANORAMIC CAMERA
Roderic M. Scott, Stamford, Conn., assignor to The Perkin-Elmer Corporation, Norwalk, Conn., a corporation of New York
Continuation of application Ser. No. 791,628, Feb. 6, 1959. This application May 21, 1962, Ser. No. 198,697
6 Claims. (Cl. 95—12.5)

The present invention is a continuation of patent application Serial No. 791,628, filed February 6, 1959, now abandoned, and relates to photography and more particularly to an optical system for a camera of the panoramic type adapted to be mounted in an aircraft or spacecraft to take wide angle photographs of the type shown, for example, in Patent No. 2,593,088.

As understood in the photographic art a panoramic camera is one in which the optical axis sweeps or scans the view to be photographed. This is distinguished from motion picture cameras wherein the optical axis is fixed at the entrance to the camera and image motion at the film may be achieved by a rotating prism disposed in the optical path between a fixed lens and the film.

One of the primary disadvantages of some prior panoramic cameras has been the intermittent motion of the film through the film plane. The starting and stopping shocks resulting from intermittent motion of the film feeding mechanism and other parts of the camera cause vibrations that result in image degradation and resolution loss. In these prior cameras, it is generally necessary to quickly bring the film feed rate to its normal feed rate and correspondingly quickly stop the film feed at the end of a frame. The mechanism for this acceleration and deceleration of the film causes movement and vibration of the camera with loss of picture definition. Not only should the film feed continuously, but the scanning mechanism and all other moving parts of the camera and optical system should also move at a uniform, continuous rate.

It is, therefore, proposed to provide a panoramic camera employing a continuous film feed. With the film continuously moving, the scanning optics must have a nearly one hundred percent duty cycle in order to avoid waste of film. Other considerations in an optical system for the present type of camera are simplicity of design, minimization of the number and size of the optical elements and minimization of weight.

Accordingly, a primary object of the present invention is to provide an optical system for panoramic cameras wherein the moving elements may operate continuously.

Another object of the present invention is to provide a panoramic camera employing continuous film feed.

Another object of the present invention is to provide an optical system for a panoramic camera wherein there is a substantially full duty cycle of the scanning apparatus.

A still further object of the present invention is to provide an optical system for panoramic cameras wherein image degradation, due to starting and stopping shocks of moving elements, is minimized.

A still further object of the present invention is to provide a panoramic camera optical system of simple design having a minimum number of optical elements.

In accordance with these and other objects, the present invention contemplates an optical system having two optical paths. In one embodiment, a continuously rotating prism is provided that alternately directs the image of the terrain to the two parts. The elements are positioned for a nearly one hundred percent duty cycle of the prism and each path includes in order the scanning prism, lens, reflecting mirror, and synchronized shutter. A slit is provided in each of the paths and the film is continuously fed past the two slits which are spaced a predetermined distance apart. Thus, as the prism rotates to scan a strip, the image is directed through the first optical path to the first slit in the path of film feed and during the next scan of the terrain the prism directs the image through the second optical path and to the second slit.

The invention will be more fully understood from the following description of a specific embodiment thereof taken from the drawings in which.

FIG. 3A and B are illustrations to aid in understanding the film overlap arrangement;

FIG. 4 is a diagrammatic view illustrating the mechanical movements of certain elements;

FIGS. 5A through 5D are diagrammatic views illustrating the positions of the scanning prism at the times in the cycle that the shutters are operated.

Figure 1:
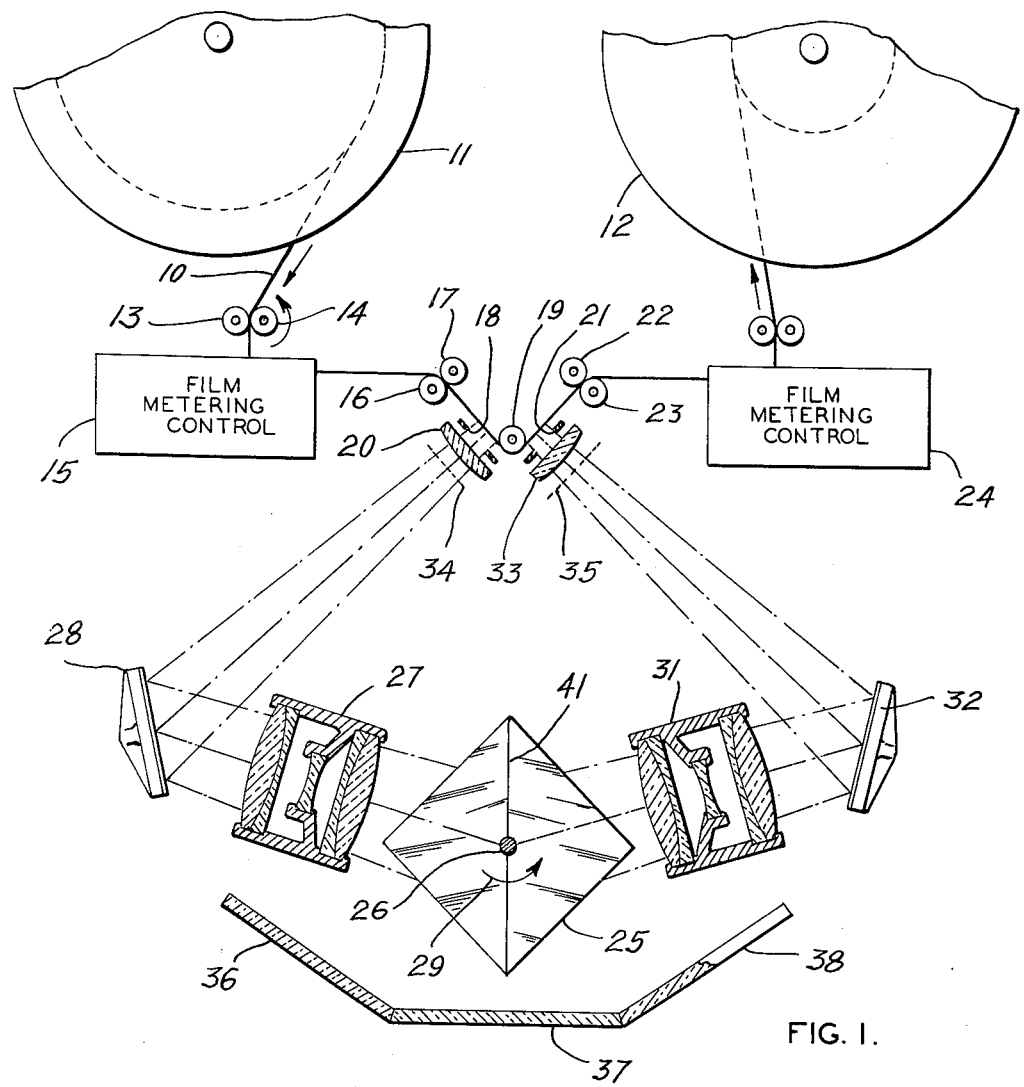
FIG. 1 is a diagrammatic sectional view of the optical system of the camera as it would be installed in an airplane, said section taken perpendicular to the direction of flight.

Referring now to the drawings and more particularly to FIG. 1, a film strip 10 is fed from a film supply spool 11 and received by a takeup spool 12. From the supply spool the film passes between a pair of rollers 13 and 14 that are pressed against the opposite sides of the film. Roller 14 is a driven roller and serves to feed the film from the supply spool. A suitable film metering system 15 controls the film feed so that the film progresses at a uniform rate and under a constant tension. From the unit 15 the film passes between rollers 16 and 17, past a first slit 18, around roller 19, past a second slit 21 and between rollers 22 and 23. The roller 23 is the film drive roller and in cooperation with roller 22 drives the film past the slits. The film is then received by a film metering arrangement 24 and then passed to the takeup spool 12. Film metering controls 15 and 24 may take any convenient form, and since the details thereof do not constitute part of the present invention, they are herein shown in block form. It need only be mentioned that they serve to provide a continuous and uniform feed for the film strip.

In the embodiment of FIG. 1, there is one scanning prism 25 mounted on a shaft 26 to which power is supplied for the purpose of rotating the prism at a uniform rate. This may be accomplished by a suitable gearing arrangement from the film feed drive as shown in FIG. 4. The shaft of film feed roller 14 is coupled by bevel gears to a vertical shaft 48 which in turn drives the prism by a second set of bevel gears. It is, of course, understood that other coupling arrangements could be employed to provide the necessary synchronization of the film feed and prism rotation. The scanning prism may comprise two right angle prisms having their hypotenuse faces abutting and forming a reflective surface. A first optical path includes a suitable lens 27, located adjacent the scanning prism, and having its axis disposed at an angle $\theta$ with the horizontal. Reflecting mirror 28 and a field lens 20 direct the scanned image to the focal plane slit 18. The second optical path is structurally symmetrical with the first and includes lens 31, reflecting mirror 32 and field lens 33. A pair of shutters 34 and 35 synchronized with the prism are interposed in the two optical paths as shown. A window arrangement such as windows 36, 37 and 38 are provided and would be located in the bottom of the airplane in which the camera is installed. The scanning prism 25 may be rotated in a counter-clockwise direction as shown by arrow 29. As the prism thus rotates, its reflecting surface 41 will direct the image of a strip of terrain from horizon to horizon through one of the optical paths. Then after the prism has rotated through a predetermined angle, the next strip of terrain will be scanned and its image will pass through the second optical path to the film. The images thus produced will pass one of the slits 18 or 21 disposed parallel to the direction of flight or perpendicular to the plane of the drawing of FIG. 1.

Figure 2:
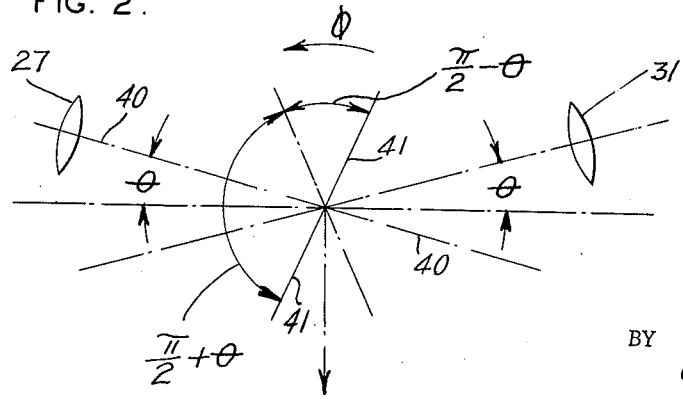
FIG. 2 is a development of the optical system illustrating the frame spacing features of the present invention.
Figure 5A:
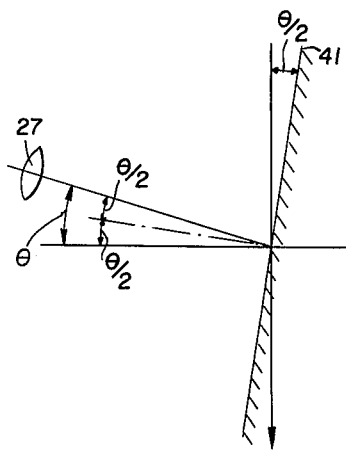
Figure 5B:
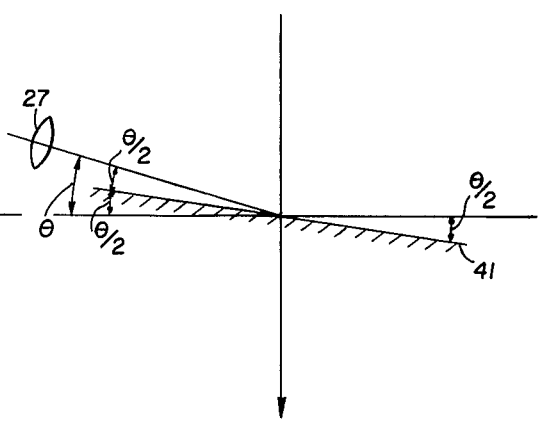
Figure 5C:
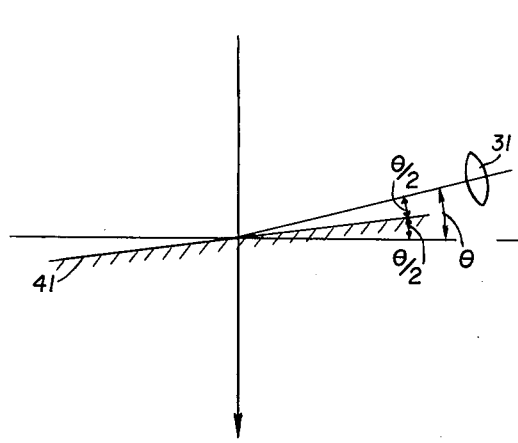
Figure 5D:
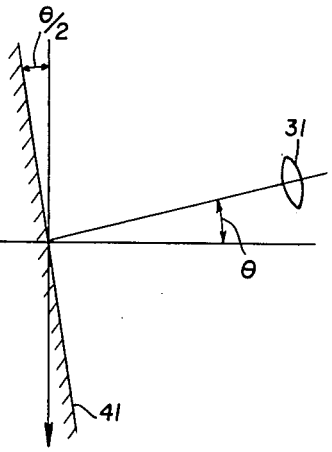

Since the scanning of the terrain is performed by rotating a prism with a reflecting face, the image moves at twice the rotational speed of the prism. The linear speed of the image is the rotational speed of prism 25, expressed in radians per unit time, times the focal length of the lens. In order that the photographic image be sharp, the film must be driven with a linear speed equal to that of the image. An additional consequence of the fact that the image moves at twice the rotational speed of the prism is that the terrain is scanned twice for each rotation of the prism. In FIG. 2, the axis of each lens, 27 and 31 is inclined upward at an angle $\theta$. While this is not necessary, such an arrangement permits each lens to see under the other to view the horizontal direction. When the mirror face, 41, is at an angle $\theta/2$ before reaching the vertical the left horizontal direction is directed into lens 27 along its axis and shutter 34 opens (FIG. 5A). After the mirror has turned through an angle of 90°, and is at $\theta/2$ before the horizontal position, the right horizontal direction is reflected along the axis of lens 27 (FIG. 5B) and the shutter 34 closes. Midway between these two positions, the mirror passed through a position where a point directly below the camera was reflected along the axis of lens 27 as shown by the dash-dot line 40 of FIG. 2. Continuing the rotation, when the mirror face in the prism arrives at a position $\theta/2$ after the horizontal (FIG. 5C), the left horizontal direction is reflected along the axis of lens 31 and shutter 35 opens. Again, after 90° of rotation the mirror arrives at a position $\theta/2$ (FIG. 5D) after the vertical and then the right horizontal direction is reflected along the axis of lens 31 and shutter 35 closes. Since this is now an angle $\theta$ beyond the starting position, there has been some overlap in time between the exposures through lens 27 and lens 31. Shutter 34 opened when the mirror made an angle of $\theta/2$ before the vertical and shutter 35 did not close until the angle became $\theta/2$ after the vertical. While the scan was being directed to lens 31, the mirror passed through a position where the object directly under the camera was directed along the axis of the lens. This position is shown by the solid line 41 in FIG. 2. It is clear that the angle between the two positions of the mirror where the nadir is on the axis of first lens 27 and then 31 is $\pi/2+\theta$ while the angle between the two positions first of 31 and then 27, $\pi/2-\theta$. Since these two angles differ by $2\theta$ and since the prism rotates at a uniform rate, the nadir points will not be seen at equal intervals in time. The film also moves at a uniform rate and, thus, the distance along the film between corresponding points on adjacent frames will not be equal unless the images are displaced. This is accomplished by a displacement of the slits 18 and 21 so that the distance between them along the film path is $2\theta$ radians times the focal length. This is a particularly novel feature of the present invention and results in equal spacing of frames.

Any conventional gearing mechanism may be employed for operating the shutters 34 and 35. Since this operation is synchronized with the rotating scanner and film, the shutter mechanism may be taken from the gearing arrangement of FIG. 4. Since the particular mechanical arrangement for operating the shutters forms no part of the present invention, this is indicated by block diagram in FIG. 1.

Because the time interval between successive frames is not equal, and the aircraft in which the camera is mounted is travelling at a constant velocity, provision is made to compensate for the unequal overlap that would result. With a prism rotation of $\phi$ radians per second, the time interval between successive frames may be represented as follows:

$$\Delta t = \frac{\pi/2 \pm \theta}{\phi}$$

It has been found that an angle $\theta$ of approximately fifteen degrees is preferred and thus $$\Delta t = \frac{\pi(6 \pm 1)}{12\phi}$$

and the time intervals between frames alternates in a ratio of 5 to 7. Thus with the stereo base or time interval between successive frames alternating in the ratio of 5 to 7, if each lens were centered on the film center line the overlap would vary alternately in the same ratio. Since a constant uniform overlap is desired, the lenses 27, 31 are displaced along the flight axis or perpendicular to the plane of FIG. 1. Thus lens 31 is displaced slightly backward and lens 27 displaced forward along the line of flight to effect constant overlap of successive frames. This may be readily seen by referring to FIG. 3A wherein the overlap without lens displacement is illustrated. If, for example, a 55% overlap is desired the image would be displaced 45% of the film width for each scan, or 90% for the full cycle interval of two scans. Thus, in FIG. 3A, with the direction of flight from left to right, the left triangle would represent the area scanned during that part of a scanning cycle when the shutter 34 would be open. The middle triangle represents the next scan which in the example chosen would overlap the first by 47% as designated on this figure. The next scan, represented by the right triangle will overlap the second by 63%. The alternating overlaps of 47% and 63% result from the 5 to 7 alternating time cycles between frames as explained above. In the above example with the time interval in the ratio of 5 to 7, the actual image displacement on the film without lens displacement would alternate between 37½% and 52½% of film width. To obtain constant overlap in this example, the lenses are separated by half the difference or 7½% to obtain 45% displacement or the required 55% overlap.

This is illustrated in FIG. 3B wherein 42 represents the center of format line for the scan through lens 31 which is displaced slightly forward and line 43 the center of format for the scan through lens 27 displaced slightly backward. Thus, it is seen that these two successive scans, which without lens displacement, would overlap 47% now overlap 55%. Then as the image is again directed through lens 31, displaced forward, the image overlap with the preceding scan is also 55%.

It is understood that as the plane progresses along its line of flight during each strip scan, relative image motion will occur. It has been found that this can be conveniently compensated for by appropriately oscillating lenses 27 and 31 parallel to the flight path and in synchronization with the rotating prism. With the present scan method, the image motion is sinusoidal with the maximum velocity occurring at the nadir. This image motion compensation can be effected by oscillating the lenses 27, 31 harmonically through a suitable arrangement coupled to the prism drive shaft.

FIG. 4 illustrates one means for effecting harmonic motion of the lenses in synchronization with the rotating prism. A motor 44 rotates a shaft 45 to operate film feed roller 14. Through the mechanical linkage of bevel gears 46, 47, shaft 48, bevel gears 49, 51 and shaft 52, the prism 25 is rotated in synchronization with the film roller. It should, of course, be understood that other systems could be employed to provide the exact synchronization of the film feed and prism rotation and that the arrangement shown in FIG. 4 is merely an example of one specific embodiment.

A bevel gear 53 secured to shaft 48 cooperates with a pair of gears 54, 55 secured to shafts 56 and 57 respectively to rotate disks 58 and 59 respectively. Each of said disks has a pin, such as pin 61 of disk 59, which is received in a slotted member 62 and 63 each of which is secured to a push bar 64 and 56 respectively. Thus, as the disks rotate, harmonic motion is transmitted to the lenses 31 and 27 which reciprocate back and forth in tracks 66, 67 respectively.

It is seen then from the above description that there is provided an optical system for taking strip photographs in which all moving parts move continuously. There is no starting and stopping of mechanical elements to cause shocks and vibrations as in prior art instruments of this type. In addition, there is almost full utilization of the film strip. Thus by means of a system employing two optical paths applicant has provided a panoramic camera that overcomes many of the disadvantages of prior art cameras of this type.

Although the present invention has been described with respect to a specific embodiment thereof, it is understood that this is not to be considered as limiting the scope of the invention as defined in the appended claims. For example, the scanning apparatus could take many forms and is not limited to one double prism as illustrated.

I claim:

1. An optical system of the character described comprising a continuously rotating prism having a plurality of reflective surfaces adapted to scan strips of terrain, first and second optical paths located on each side of said prism and symmetrical with respect to a plane passing through the axes of rotation of said prism, each optical path including lens means located adjacent said prism and having its principal axis disposed at a predetermined angle, slit means positioned in each optical path to receive a scanned strip image, each of said slit means being arranged parallel with the rotational axis of said prism, means to direct a continuously fed film strip past each of said slit means, the feed of said film being synchronized with the rotation of said prism and at a feed rate whereby the linear speed of the image at the slit means equals the linear speed of the film, said two slit means being spaced apart along the path of the film strip a distance equal to twice said predetermined angle measured in radians times the focal length of said lens means whereby the film advances a distance equal to the path length between the slits as the prism rotates through an angle equal to said predetermined angle, each of said lens means being offset in a direction parallel to the prism axis whereby the overlap between adjacent frames is maintained constant.

2. An optical system of the character described comprising a continuously rotating prism having at least two reflective surfaces adapted to scan strips of terrain, first and second optical paths located on each side of said prism and symmetrical thereto, each optical path including lens means located adjacent said prism and having its principal axis disposed at a predetermined acute angle, slit means positioned in each optical path to receive a scanned strip image, each of said slit means being arranged parallel with the rotational axis of said prism, means to direct a continuously fed film strip past each of said slit means, the feed of said film being synchronized with the rotation of said prism and at a feed rate equal to twice the rotational speed of the prism times the focal length of the lens means, said two slit means being spaced apart along the path of the film strip a distance equal to twice said predetermined angle measured in radians times the focal length of said lens means whereby the film advances a distance equal to the path length between the slits as the prism rotates through an angle equal to said predetermined angle, each of said lens means being offset in a direction parallel to the prism axis whereby the overlap between adjacent frames is maintained constant and means to oscillate said lens means harmonically to compensate for image motion.

3. An optical system for a panoramic strip camera comprising a continuously rotating scanning means having a plurality of reflective surfaces adapted to scan strips of terrain, first and second optical paths, each optical path including lens means having its principal axis disposed at a predetermined angle to the horizontal, slit means positioned in each optical path to receive a scanned strip image from the lens means, means to direct a continuously fed film strip past each of said slit means, the feed of said film strip being synchronized with the rotation of said scanning means and at a rate whereby the linear speed of the image at the slit means equals the linear speed of the film, the slit means in each of said first and second optical paths being positioned apart from each other a distance along the path of the film strip a distance equal to twice said predetermined angle measured in radians times the focal length of said lens, a shutter positioned in each of the optical paths, said shutters being operable to permit images of alternate strip scans to pass to the two slit means alternately.

4. An optical system for a panoramic camera comprising continuously rotating reflective scanning means adapted to scan strips of terrain, first and second optical paths, each optical path including lens means, slit means positioned in each optical path at the focal plane of each lens means to receive a scanned strip image from the lens means, means to direct a continuously fed film strip past each of said slit means, the feed of said film being synchronized with the rotation of said rotating reflective scanning means whereby the image velocity at the focal plane of each lens is equal to the velocity of the film past said slit means, and means to oscillate said lens means harmonically to compensate for image motion.

5. In a panoramic camera adapted to be mounted in an aerospace vehicle to scan strips of terrain over which the vehicle passes, an optical system comprising reflecting scanning means adapted to be continuously rotated to scan strips of terrain, first and second optical paths, each optical path including lens means, slit means positioned in each optical path, said lens means being positioned in the optical path between the said scanning means and said slit means, means to direct a continuously fed film strip past each of said slit means, the feed of said film strip being synchronized with the rotation of said scanning means whereby the image velocity at the film is equal to the velocity of the moving film strip, shutter means disposed adjacent each slit means operable in synchronization with said scanning means whereby imaged strips of terrain are directed over said first and second optical paths alternatively to said film, and means operable in synchronization with said scanning means and film feed means to oscillate each of said lens means harmonically in a direction parallel to the line of flight to compensate for image motion.

6. In a panoramic camera adapted to be mounted in an aerospace vehicle to scan strips of terrain over which the vehicle passes, an optical system comprising reflecting scanning means adapted to be continuously rotated to scan strips of terrain, first and second optical paths, each optical path including lens means, slit means positioned in each optical path, at the focal plane of the respective lens means, said lens means being positioned in the optical path between the said scanning means and said slit means, means to direct a continuously fed film strip past each of said slit means, the feed of said film strip being synchronized with the rotation of said scanning means whereby the image velocity at the film is equal to the velocity of the moving film strip, shutter means disposed adjacent each slit means operable in synchronization with said scanning means whereby imaged strips of terrain are directed over said first and second optical paths alternately to said film, and means operable in synchronization with said scanning means and film feed means to oscillate each of said lens means harmonically in a direction parallel to the line of flight to compensate for image motion.

References Cited by the Examiner

UNITED STATES PATENTS

| | | | |
|---|---|---|---|
| 2,476,504 | 7/1949 | Maytum | 352—119 |
| 2,928,313 | 3/1960 | Hattori | 88—24 X |
| 2,946,257 | 7/1960 | Strang et al. | 352—84 |
| 2,955,518 | 10/1960 | Perry | 352—69 |
| 2,966,096 | 12/1960 | D'Incerti et al. | 88—24 X |

JOHN M. HORAN, *Primary Examiner.*

JULIA E. COINER, NORTON ANSHER, *Examiners.*